L. S. & A. W. HAGERMAN.
WINDMILL REGULATOR.
APPLICATION FILED DEC. 30, 1909.
969,366.
Patented Sept. 6, 1910.
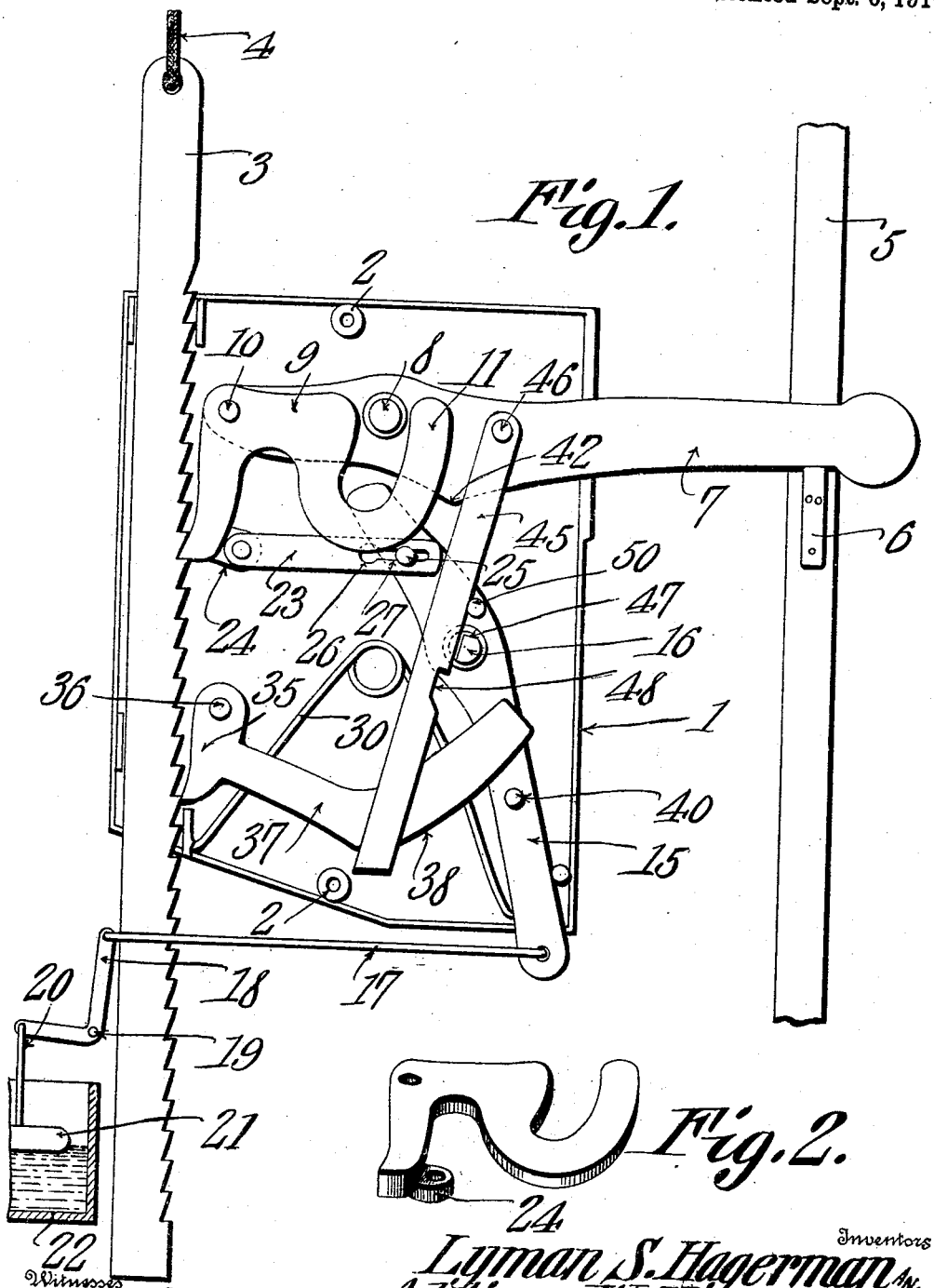

UNITED STATES PATENT OFFICE.

LYMAN S. HAGERMAN AND ADDISON W. HAGERMAN, OF MONDAMIN, IOWA.

WINDMILL-REGULATOR.

969,366.  Specification of Letters Patent.  Patented Sept. 6, 1910.

Application filed December 30, 1909.  Serial No. 535,699.

*To all whom it may concern:*

Be it known that we, LYMAN S. HAGERMAN and ADDISON W. HAGERMAN, citizens of the United States, residing at Mondamin, in the county of Harrison and State of Iowa, have invented a new and useful Windmill-Regulator, of which the following is a specification.

This invention relates to wind mill regulators such as are designed, mechanically, to stop the operation of wind mills by drawing the same out of the wind when the tank is filled to the proper level and automatically to start the operation of the mill when the level of the water falls in the tank.

The objects of the invention are to improve and simplify the construction and arrangement of such devices as well as to increase their efficiency in operation and to decrease the expense attending their manufacture.

With the foregoing and other objects in view which will appear as the description proceeds, the invention resides in the combination and arrangement of parts and in the details of construction hereinafter described and claimed, it being understood that changes in the embodiment of the invention herein described can be made within the scope of the claims without departing from the spirit of the invention.

In the accompanying drawing forming part of this specification Figure 1 is a side elevation of a device constructed in accordance with the invention, the operating parts being adapted to be located within a suitable casing, one-half of which is illustrated in the drawing, the other half being removed. Fig. 2 is a perspective detail view of one of the gravity actuated pawls.

Like reference numerals indicate corresponding parts in the different figures of the drawing.

The wind mill regulator of the present invention, briefly outlined, comprises a device, such, for example, as a rack bar for drawing the wind mill out of the wind, said device being connected with the wind mill by means such as a wire or rope; an operating element such as a lever or other device actuated by the pump rod and connected with the said rack bar and a means controlled by the rise and fall of the water in the tank for moving said operating element into or out of communication with the pump rod.

The reference numeral 1 indicates the casing in which the operating parts of the device are located, the said casing being adapted to receive a suitable cover plate which is not shown but which is to be fastened to the spools or columns 2.

The rack bar for drawing the wind mill out of the wind is designated by the reference numeral 3 and is suitably connected with the wind mill by means such as the rope or wire 4.

The pump rod is indicated by the numeral 5 and is provided with a cleat or projection 6 for actuating the mechanism which operates the rack bar 3.

The operating element or mechanism which is actuated by the pump rod 4, consists preferably of a lever 7 which is fulcrumed at 8 within the casing 1 and at its outer end is normally in engagement with the cleat 6 upon the pump rod 5 whereby the vertical movements of said pump rod serve to rock the operating element or lever 7. At its inner end, adjacent the rack bar 3, the operating element 7 is pivoted at 10 and is preferably gravity actuated, the outer end 11, of said pawl being heavier than the inner end and being preferably in the form of an inverted U-shaped hook so as to form a slot which receives the fulcrum 8 of the operating element or lever 7, whereby any accidental turning or upsetting of the pawl 9 is avoided. It will be obvious that by means of the pawl 9 the movements of the pump rod 5 are communicated through the operating element 7 to the rack bar 3, while said pawl 9 is in engagement with said rack.

The means controlled by the rise and fall of the water in the tank for throwing the operating element or lever 7 into and out of operation, will now be described. This means includes a controlling lever 15 which is fulcrumed at 16 within the casing 1. The lever 15, at its lower end is connected by means such as the link or cord 17, with a bell crank lever or other device 18 fulcrumed at 19, which is in turn connected with the stem 20 of a float 21 arranged in the tank 22. The upper end of the controlling lever 15 is connected by means such as the link 23 with an ear or lug 24 formed on the pawl 9. The connection between the controlling lever 15 and the link 23 preferably is as shown in Fig. 1 and consists of a headed pin 25 mounted in the lever 15 and adapted to be passed through an enlarged opening 26 in the link 23, and then to pass into a slot 27 leading out of the opening 26 as shown. The lever 15 is thrown in one direction by means such as the spring 30.

The parts are shown in the drawing in the position which they occupy when the tank is nearly filled and each movement of the pump rod 5 is caused to create a downward movement of the rack bar 3, any upward movement of said rack bar being prevented by means of a check pawl 35 fulcrumed at 36 and having a weight-arm 37 which has a cam face 38 for a purpose hereinafter described. When the rack bar is drawn downward so that the topmost notch is down to its lowest position, the wind mill is pulled out of operation and all of the parts cease working. When, however, the water in the tank 20 drops sufficiently below its normal level, the float 21 operates the angle lever 18 and thus draws the lower end of the controlling lever 15 to the left, whereupon a pin 40 upon said lever 15 rides along the cam face 38 of the check pawl 35 and raises the arm 37 thereof so as to move said pawl out of engagement with the rack bar 3. At the same time the upper end of the controlling lever 15 through the action of the link 23, draws the pawl 9 out of engagement with the rack bar 3 and permits said rack bar to move upward and release the wind mill so it can swing into the wind and begin to operate. Moreover, the continued movement to the right of the upper end of the controlling lever 15 causing said end to wipe along the cam face 42 of the operating lever 7 so as to raise the same sufficiently for a bar 45 pivoted upon a fulcrum 46 upon the lever 7 to engage an angular shoulder 47 formed on the fulcrum 16 of the lever 15, said bar 46 being formed with a notch 48 to engage said shoulder 47. When in this elevated position the lever 17 is out of the path of the movement of the cleat 6 on the pump rod 5 and the parts thus remain immovable until the rise of the float in the tank 6 releases the tension or pull on the link 17, whereupon the spring 30 throws the lower end of the controlling lever 15 to the right, thus causing a pin 50 on said lever 15 to engage the bar 45 and throw it out of engagement with the shoulder 47 on the fulcrum 16, after which the lever 7 falls against the cleat 6, and begins to operate to draw the rack bar downward. The notches on the rack bar 3 are so arranged that the wind mill will be drawn out of the wind when the uppermost notch is engaged by the pawl 9, whereby any tendency for the rack bar 3 to be pulled down far enough to break the wire or cord is avoided.

The wind mill regulator of the present invention is strong, simple, durable and inexpensive in construction as well as thoroughly efficient in operation.

What is claimed is:

1. A wind mill regulator comprising a rack bar, an operating lever provided with a laterally extending fulcrum, a gravity actuated pawl mounted on said operating lever having a hooked shaped portion to receive the fulcrum of said operating lever, and means for moving said operating lever into and out of connection with the pump rod.

2. A wind mill regulator comprising a casing, a rack bar in said casing, an operating lever adapted to be operated by the pump rod, a gravity pawl on said operating lever, a controlling lever, a link connecting said controlling lever with said gravity actuated pawl, a bar pivotally connected with said operating lever and having a notch adapted to engage the fulcrum of said controlling lever, a pin on said controlling lever for engaging said last mentioned bar, a check pawl for said rack bar having an arm formed with a cam face, a pin on said controlling lever for engaging the cam face of said check pawl, a spring for throwing said controlling lever in one direction, and a tank float for throwing said controlling lever in the other direction.

3. A wind mill regulator comprising a rack bar for drawing the mill out of the wind, a pump rod, an operating lever adapted to be operated by the pump rod, a gravity actuated pawl mounted upon said lever and having a hooked shaped portion to receive the fulcrum of said lever, a controlling lever, a link connecting said controlling lever with said pawl, the upper end of said controlling lever being adapted to engage a portion of said operating lever to throw the same out of connection with the pump rod, a bar pivotally connected with said operating lever and having a notch adapted to engage the fulcrum of said controlling lever to hold the operating lever in raised position, a pin on said controlling lever for moving said last mentioned bar out of engagement with the fulcrum of the controlling lever, a gravity actuated check pawl having an arm formed with a cam face, a pin on said controlling lever for engaging the cam face on the check pawl, a spring for moving said controlling lever in one direction, a tank float, and a link connecting said float with said controlling lever.

In testimony that we claim the foregoing as our own, we have hereto affixed our signatures in the presence of two witnesses.

LYMAN S. HAGERMAN,
ADDISON W. HAGERMAN.

Witnesses:
M. T. McEvoy,
H. D. Silsby.